Patented June 1, 1937

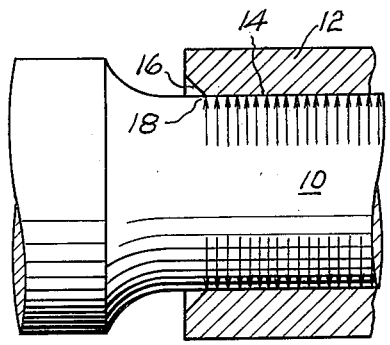
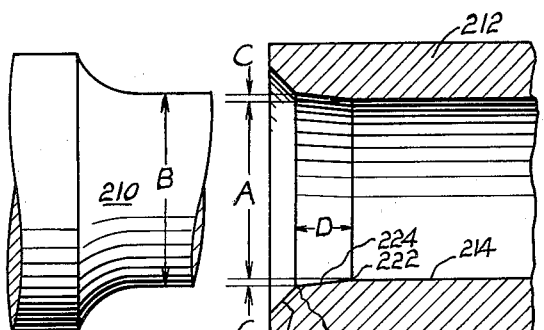
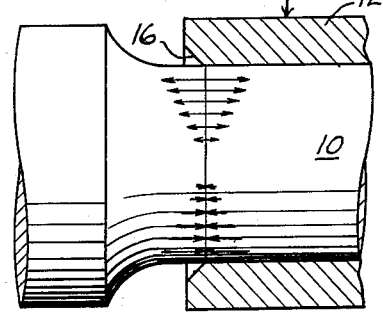
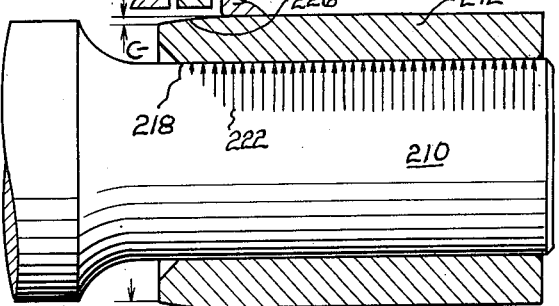
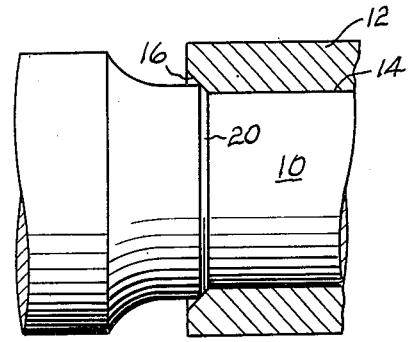
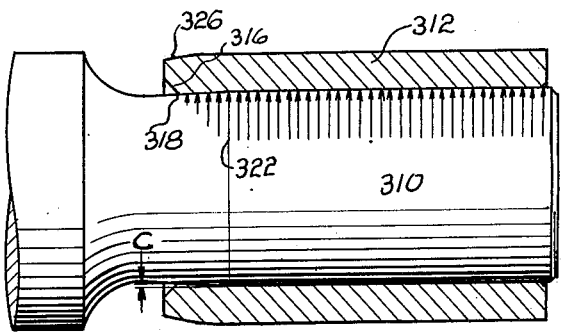
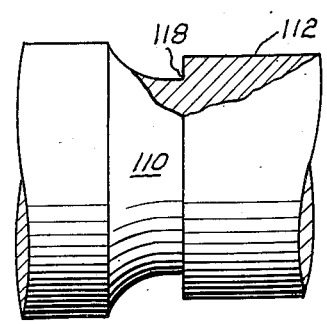
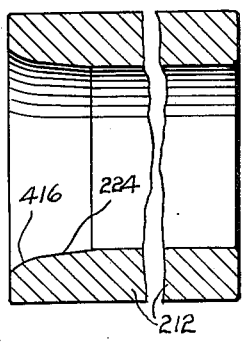

2,082,379

UNITED STATES PATENT OFFICE 2,082,379

PRESS FITTING

Richard J. Brittain, Jr., Bloomfield, N. J., assignor to General Motors Corporation, Detroit, Mich., a corporation of Delaware Application April 11, 1934, Serial No. 720,147

8 Claims. (Cl. 287—52)

This invention relates to press-fitting and comprises all of the features and aspects of novelty herein disclosed. An object of the invention is to provide an improved method of press-fitting parts, such as sleeves or the like on shafts. Another object is to provide improved means of avoiding shaft failure, as when a hollow member is pressed upon a rotatable shaft and transmits load thereto. Another object is to provide an improved shaft and sleeve combination. To these ends and also to improve generally upon methods and devices of this character, the invention further consists in the various matters hereinafter described and claimed.

In its broader aspects, the invention is not necessarily limited to the specific construction and method steps selected for illustration in the accompanying drawing in which Figs. 1 to 4 are sectional views indicating somewhat diagrammatically certain forces and conditions arising when sleeves and shafts are combined.

Fig. 5 is a sectional view of portions of the improved shaft and sleeve combination, certain small dimensions being exaggerated.

Fig. 6 is a sectional view with the sleeve pressed on the shaft and showing certain conditions of stress.

Fig. 7 is a sectional view of a modification.

Fig. 8 is a sectional view of a sleeve.

When mounting bushings, bearing race rings and the like upon shafts, it is common practice to use press fits in order that such bushing or ring may be securely held and supported. Sometimes the bore of the bushing is provided with a comparatively steep chamfer at one end to provide a lead when pressing the bushing on the shaft. So far as I am aware, however, the bore of the bushing or ring has been of uniform diameter or straight except at the chamfer and the surface stresses due to the press fit have been substantially uniform along the shaft. In any event, there has been an abrupt termination of the magnitude of the stress at the end of the bushing, and shaft failure under load has frequently occurred at this point. The condition is illustrated in Fig. 1 wherein the numeral 10 represents a shaft, such as a railway axle, on which is pressed the inner race ring or sleeve 12 of a roller bearing, the sleeve having a straight bore 14 extending to a steep chamfer 16. The arrows indicate the substantially uniform pressure or stress between sleeve and shaft and it is apparent that the stress terminates very abruptly at the point 18 where the chamfer begins and the straight bore terminates.

Fig. 2 indicates a condition which occurs when load is applied. For this load, there must be a corresponding tension stress in the upper fibres of the shaft and a corresponding compression stress in the lower fibres, all as indicated by the arrows. Both tension and compression stresses are maximum at top and bottom in the line of the load but are continually reversing as the shaft rotates. Thus when the shaft turns 180°, the portion initially having maximum tension stress comes under maximum compressive stress and the portion initially having maximum compressive stress comes under maximum tension stress. These bending stresses are to a great extent localized in the plane where the straight bore 14 terminates because of the press fit and the abrupt termination of surface stress.

The condition of the loaded and rotating shaft is further illustrated in exaggerated degree in Fig. 3. For every load, the shaft has a corresponding deflection or bending and the deflection is concentrated at the point of greatest stress which is at the bore termination. As the shaft deflects, the pressed-on race sleeve tends to indent the shaft at the lower side. Due to shaft rotation, this tendency to indent is effective for the entire circumference and a minute shoulder 20 forms on the shaft where the bore 14 terminates. This indenting increases the effect of stress localization produced by the press fit. As a result, the metal in the shaft is subjected to gradual surface fatigue which progresses until a circumferential surface crack starts in the shaft where the bore 14 terminates or at the shoulder 20. This crack becomes a progressive fracture which ultimately results in shaft breakage.

Fig. 4 shows a shaft 110 with an enlarged portion 112 terminating with a sharp corner 118. The condition is directly comparable to that shown in the preceding figures, except that the height of the enlargement 112 would be somewhat less than the thickness of the race sleeve 12 to produce the same effect.

In order to overcome the bad effects noted above, the present invention provides exceedingly simple means for preventing localized stress. In Fig. 5, dimension A represents the inside diameter of a sleeve 212 to be mounted with a press fit on a shaft 210 of diameter B. The difference between these diameters is determined by the desired amount of press fit. Dimension C is the radial allowance for the press fit and is exaggerated in the drawing. In practice it would frequently be only about two thousandths of an inch. If the sleeve bore were made to dimension A for its entire length, the bad conditions illustrated in Figs. 1 and 2 would occur. If the bore were made to dimension A plus 2C, there would be zero stress between the shaft and the sleeve. In the actual construction shown, the race bore has a straight portion 214 meeting at 222 a slightly angled or tapered portion 224 which has an axial length D and joins a chamfer 216. When this sleeve 212 is pressed on the shaft, the conditions illustrated in Fig. 6 are secured. Here the surface stress between the sleeve and the shaft is indicated by the arrows. For a considerable distance, the stress is uniform and maximum. From the arrow 222 to the point 218, along a distance corresponding to the dimension D of Fig. 5, the stress gradually decreases and fades out to zero. Thus there is no abrupt change in surface stress as in Fig. 1 and the localized tension and compression stresses indicated in Fig. 2 are avoided.

One effect of the internal taper and the press fit is that the outer surface of the sleeve 212 will become slightly tapered near the end as indicated at 226. This external taper is less than dimension C and does no harm even in the case of a roller bearing because the rollers, of which one is indicated at 228, usually terminate short of the end of the race sleeve and the usual cage, a portion of which is indicated at 230, overlies the tapered end portion of the sleeve. The length of the internal taper or dimension D may be increased to any desired extent to get a more gradual change in stress when the length of the external taper at 226 is of no consequence. It is preferred to make dimension C slightly greater than the radial press fit allowance in order to be sure and have the press fit terminate or fade out in the tapered portion.

Fig. 7 illustrates a modification wherein the same results are obtained in a different way. The ring or sleeve 312 has its bore wall initially straight except for a chamfer 316. The shaft 310 is straight from its end to the region of the arrow 322 and then tapers down or decreases in diameter so that the press fit stress becomes zero at the point 318. Dimension C is the radial allowance for the press fit as before. The exterior end portion 326 of the sleeve will become tapered as well as the interior portion between points 318 and 322 because in those regions the sleeve has less than maximum stretching under the press fit. Thus, paradoxically, the shaft becomes stronger and less liable to failure by thinning it down.

As indicated in Fig. 8, the sleeve 212 of Figs. 5 and 6 may be provided with a chamfer 416 formed by a radius merging smoothly with the tapered surface 224.

I claim:

1. In a device of the character described, a shaft, a hollow member adapted to be pressed on the shaft and having its bore of uniform size, the shaft having one portion of uniform size and larger than the bore by the amount of the press fit, and another portion of the shaft being tapered down and engaging the bore with decreasing stress along the end portion thereof; substantially as described.

2. The combination with a shaft of a member having an elongated bore tightly fitting said shaft, said member having the end portions of its bore flared for a substantial distance but slightly enough to maintain contact with said shaft and thereby gradually reduce the tightness of the fit of said member on said shaft.

3. The combination with a shaft of an inner raceway member of a roller bearing thereon, said inner raceway member having an axial bore with radiused ends, the middle portion of the wall of said bore having a press fit on said shaft of from .003" to .005" tight and said fit decreasing gradually from an end of such middle portion for a substantial distance to nothing at a radiused end.

4. The combination with a shaft of an inner raceway member of a roller bearing having an elongated bore tightly fitting said shaft, said raceway member having the end portions of its bore flared a substantial distance but slightly enough to maintain contact with said shaft and thereby gradually reduce the tightness of the fit of said member on said shaft.

5. The combination with a shaft, of a member having an elongated bore tightly fitting said shaft, said member having an end portion of its bore flared for a substantial distance but slightly enough to maintain contact with said shaft and thereby gradually reduce the tightness of the fit of said member on said shaft.

6. The combination with a shaft, of an inner raceway member of a roller bearing or the like thereon, said inner raceway member having an axial bore with a chamfered end, the middle portion of the wall of said bore having a tight fit on said shaft, and said fit decreasing gradually from an end of said middle portion for a substantial distance to nothing at a chamfered end.

7. The combination with a shaft, of an inner raceway member of a roller bearing or the like having an elongated bore tightly fitting said shaft, said raceway member having an end portion of its bore uniformly tapered for a substantial distance but slightly enough to maintain contact with said shaft and thereby gradually reduce the tightness of the fit of said member on said shaft.

8. The combination with a shaft member, of a member having a bore tightly fitting the shaft member, one of said members being tapered throughout an end portion of the region of fit so as to gradually reduce the grip of the member on the shaft member from a maximum to a minimum adjacent the end of said region to avoid abrupt changes in stress.

RICHARD J. BRITTAIN, Jr.